(12) United States Patent
Sanders

(10) Patent No.: US 6,612,249 B2
(45) Date of Patent: Sep. 2, 2003

(54) ZERO NO$_x$ GASEOUS PASSIVATION PROCESS

(75) Inventor: Robert L. Sanders, El Centro, CA (US)

(73) Assignee: Unique Patents.com, LLC, Imperial, CA (US)

(*) Notice: Subject to any disclaimer, the term of this patent is extended or adjusted under 35 U.S.C. 154(b) by 0 days.

(21) Appl. No.: 09/811,210

(22) Filed: Mar. 16, 2001

(65) Prior Publication Data

US 2002/0174646 A1 Nov. 28, 2002

Related U.S. Application Data

(60) Provisional application No. 60/192,030, filed on Mar. 24, 2000.

(51) Int. Cl.$^7$ .................................................. F23J 15/00
(52) U.S. Cl. .......................................... 110/345; 60/39.5
(58) Field of Search ................................. 110/342, 343, 110/344, 345; 423/213.2, 213.5, 239.1, 230, 247, 244.06, 244.1; 60/38.12, 39.5, 39.182; 431/2, 3, 4

(56) References Cited

U.S. PATENT DOCUMENTS

| | | | | |
|---|---|---|---|---|
| 4,286,548 A | * | 9/1981 | Brash | 122/1 R |
| 4,325,925 A | * | 4/1982 | Haas et al. | 423/239 |
| 4,466,241 A | * | 8/1984 | Inui et al. | 60/39.182 |
| 4,572,085 A | * | 2/1986 | Hepworth | 110/345 |
| 4,574,714 A | * | 3/1986 | Bach et al. | 110/346 |
| 4,598,652 A | | 7/1986 | Hepworth | |
| 4,613,487 A | * | 9/1986 | Yoon et al. | 423/244 |
| 4,693,213 A | * | 9/1987 | Yanai et al. | 122/7 R |
| 4,741,278 A | * | 5/1988 | Franke et al. | 110/342 |
| 4,771,712 A | * | 9/1988 | Engstrom et al. | 110/347 |
| 4,793,268 A | | 12/1988 | Kukin et al. | 110/343 |
| 4,804,522 A | | 2/1989 | Hass | 423/235 |
| 4,808,386 A | * | 2/1989 | Najjar et al. | 423/226 |
| 4,843,980 A | | 7/1989 | Markham et al. | 110/342 |
| 4,865,827 A | * | 9/1989 | Tachi et al. | 423/239 |
| 4,979,447 A | | 12/1990 | Farrar | 110/345 |
| 5,118,282 A | * | 6/1992 | Reynolds et al. | |
| 5,260,043 A | | 11/1993 | Li et al. | 423/239.2 |
| 5,291,841 A | | 3/1994 | Dykema | 110/347 |
| 5,517,930 A | | 5/1996 | Farwick et al. | 110/345 |
| 6,001,152 A | | 12/1999 | Sinha | 95/58 |
| 6,110,435 A | | 8/2000 | Lehner et al. | 423/235 |
| 6,206,685 B1 | * | 3/2001 | Zamansky et al. | 431/4 |
| 6,314,896 B1 | * | 11/2001 | Marin et al. | 110/345 |

FOREIGN PATENT DOCUMENTS

| DE | 35 02 732 A1 | 7/1986 |
|---|---|---|
| EP | 0 436 124 A2 | 11/1990 |

* cited by examiner

Primary Examiner—Ira S. Lazarus
Assistant Examiner—K. B. Rinehart
(74) Attorney, Agent, or Firm—Fitch, Even, Tabin & Flannery

(57) ABSTRACT

A method for reducing NO$_x$ and/or CO/CO$_2$ emissions from the combustion of coal products or hydrocarbons. One or more curtains of particulate elemental iron, in the form of flakes or the like, are fanned across the combustion chamber and/or the exiting flue gas stream while it is still at high temperature. Moreover, in a coal-fired furnace or boiler, particulate magnetite can be injected e.g. into a region just above the coal which will effectively sequester Hg and heavy metals at a location below a "rag layer" combustion zone in the vicinity of which iron is injected. Suitable particulate elemental iron can be expediently provided at the site by using a grinding wheel or the like to create thin flakes of elemental iron from a wire or rod. Some iron may also adsorb mercury via "red iron" formation and be removed along with solid oxides, iron carbide and siderite via the ash chute of a boiler. Any particulates carried downstream in the flue gas stream are removed, prior to reaching the stack, by cyclones, scrubbers, precipitators or the like.

18 Claims, 5 Drawing Sheets

US 6,612,249 B2

ZERO NO$_X$ GASEOUS PASSIVATION PROCESS

This application claims priority from U.S. Provisional Application Ser. No. 60/192,030, filed Mar. 24, 2000, the disclosure of which application is expressly incorporated herein by reference.

This invention relates to methods of reducing NO$_x$, SO$_x$, CO, CO$_2$ and/or Hg emissions from combustion sites, and more particularly relates to the reduction of such emissions when a coal product or a hydrocarbon is being burned.

BACKGROUND OF THE INVENTION

There is presently and will undoubtedly remain for years a need for the combustion of coal products and hydrocarbons to provide the energy desired throughout the world. Coal and hydrocarbons have been primary energy sources for decades and will no doubt remain even though alternative "clean" energy sources are slowly being developed. In recent years, the effects upon the atmosphere from the discharge of NO$_x$, SO$_x$, CO and even CO$_2$ have been intensely studied, and as a result, ever more stringent limits are being placed upon the discharge into the atmosphere of some or all of these products of combustion. The potential toxicity of mercury (Hg) has been known for some time, but only recently have there been imposed prohibitions against even minute discharges, which may be particularly troublesome when burning coal from certain deposits.

Heretofore, it has been possible to minimize the product ion of NO$_x$, by minimizing the amount of air that is used, which of course supplies the N$_2$ that is oxidized, and careful control has in some instances permitted the use of minimal or no excess air. However, in coal-fired boilers and the like where air is used to convey the coal to the combustion zone, in order to efficiently use that air in the combustion process, the parallel injection of fuel gas or the like is often required. This alternative of course raises costs by the differential between the cost of fuel gas and the cost of coal, per their BTU value. However, regardless of how efficiently such coal-fired boilers can be operated, such boilers and furnaces will continue to produce sulfur dioxide (SO$_2$), nitrogen oxides (NO$_x$), carbon monoxide (CO) and carbon dioxide (CO$_2$) emissions along with potential minute emissions of Hg, all of which generates photochemical smog and acid rain. Moreover, it is presently felt that such emissions constitute a cause of global warming which may have a destructive effect on vegetation and also cause the deterioration of the ozone layer, as a result of which humans become exposed to UV, resulting in lung damage and asthma.

The internal combustion engine used in cars, trucks, buses and the like throughout the world is another significant generator of NO$_x$, and although catalytic converters are effective to reduce certain emissions, there is still significant amounts of NO$_x$ exiting from the exhaust pipes of such vehicles. U.S. Pat. No. 6,110,435 describes melting urea and then adding the molten product to exhaust gas to reduce NO$_x$. This overall arrangement, however, leaves much to be desired, and superior solutions to the problem continue to be sought.

Overall, it can be foreseen in the coming decades that governmental agencies will continue to set stiffer standards from an environmental standpoint as to emissions being discharged into the atmosphere, and accordingly the search continues for improvements in reducing such emissions.

SUMMARY OF THE INVENTION

The invention provides a method for reducing NO$_x$, SO$_x$, Hg, CO$_2$ and/or CO emissions from the combustion of coal products or hydrocarbons, when such coal products or hydrocarbons are burned and create hot combustion products, by contacting those products with particulate elemental iron at a temperature of at least about 300° F., and preferably at least about 700° F. when coal is being burned, so as to cause chemical and possibly physical reactions, as a result of which solid iron oxide and/or iron carbide and/or iron carbonate reaction products are produced that can be removed from the emission stream from such combustion. As a result of such reactions, the amounts of such undesirable gaseous emissions are substantially reduced or essentially eliminated.

In one particular aspect, the invention provides a method of reducing NO$_x$, and/or CO emissions from the flue gas stream exiting from a coal-fired boiler, which method comprises burning a coal product to create hot gaseous combustion products, and exposing said gaseous combustion products to contact with particulate elemental iron at a temperature of at least about 700° F. to cause said elemental iron to chemically react therewith, whereby such chemical reactions produce solid iron oxide and/or iron carbides and/or iron carbonates that are removed from the flue gas, which becomes reduced in NO$_x$, and/or CO/CO$_2$ content as a result of such chemical reactions.

DETAILED DESCRIPTION OF THE PREFERRED EMBODIMENTS

Basically, the invention provides a method for reducing NO$_x$, SO$_x$, Hg and/or CO levels, and even the level of CO$_2$, in combustion products being discharged to the atmosphere from the burning of coal products or hydrocarbons, by exposing these combustion products, either at about the time of their creation or thereafter, to contact with iron in its elemental, unoxidized state. Iron is a very good reducing agent and, depending on conditions present, can be oxidized generally to the 2+, 3+ or 6+ state.

Hydrocarbons are intended to include all types of gaseous or liquid hydrocarbons, such as natural gas, methane, propane, butane, gasoline, diesel fluid or any of the multitude of grades of petroleum, that are commonly burned in furnaces, power-generating boilers, turbines, internal combustion engines and the like. Similarly, by coal products is meant any of the various types of combustible solid minerals that may be burned as a source of BTUs, e.g. anthacite and bituminous coal, coke, lignite, peat and the like, some of which products have been found to be contaminated with mercury (Hg). Generally, the invention utilizes one or more curtains of hot thin iron shavings which are distributed so as to mingle and react with such hot gaseous combustion products. For example, iron flakes or shavings may be injected as a curtain across the combustion region of a coal-fired boiler or furnace, and in addition or as an alternative, such particulate iron may be distributed as a blizzard of iron shavings throughout the flue gas train exiting such a furnace or boiler.

Figure 4:
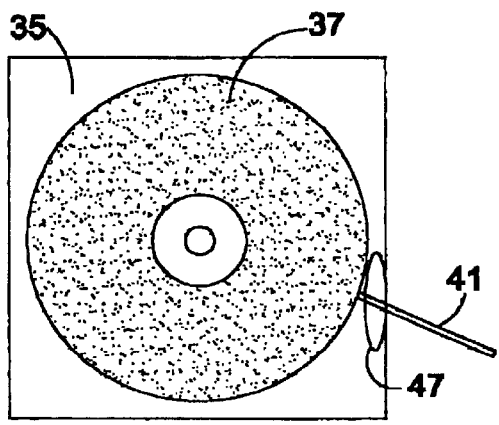
FIGS. 4, 4A and 4B are enlarged schematic views of certain of the devices depicted in FIG. 2.
Figure 4A:
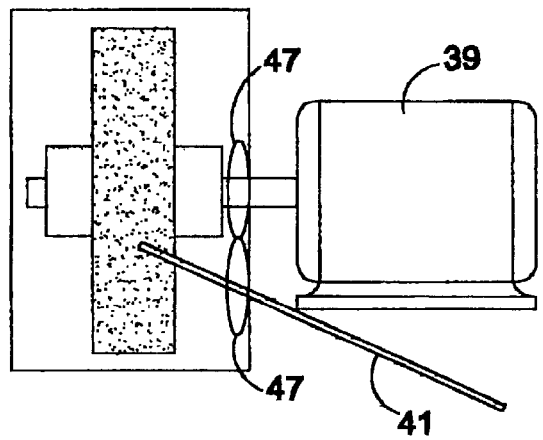
Figure 4B:
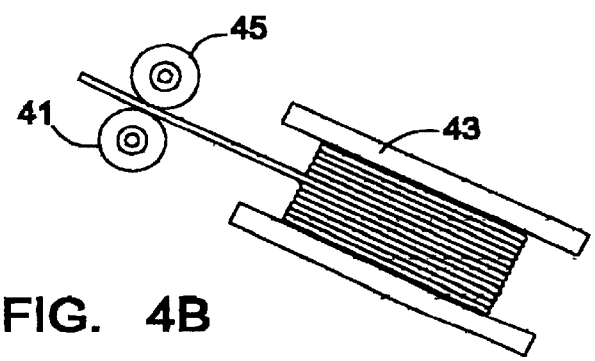

The particles or shavings of elemental iron are conveniently produced by employing a grinding wheel or the like to shave or flake particles from the end of an iron wire or soft rod being supplied to the moving grinding wheel as depicted in FIGS. 4, 4A and 4B. Although other comparable methods of providing particulate elemental iron may be employed, a wire and grinding wheel arrangement, such as that shown, is considered to be preferable. Such an operation is expedient and can take advantage of readily available materials which is important economically; for example, mild 1020 steel, generally similar to that employed in concrete slab, and having a diameter between about 3/16 and 1/2 inch can be used. Because these particulate shavings or flakes are being created in situ, elemental iron having high surface area is provided in a substantially unoxidized condition. As shown for example in FIGS. 4 and 4A, such soft steel wire may be pulled from a large reel by a pair of oppositely rotating friction-grip wheels which might be driven in any suitable manner, e.g. by gears or hydraulically. To eliminate oxidization, the grinding operation preferably takes place in a closed chamber having a nitrogen or other inert gas atmosphere; for example, the grinder is preferably located in a compartment having generally gas-tight seals located at the entries of both the motor drive and the wire feed. The compartment would open to the boiler combustion chamber into which the iron shavings might be physically propelled by momentum derived from the wheel.

Elemental iron has a greater affinity for oxygen than does either sulfur or nitrogen; it can effectively reduce sulfur dioxide and $NO_x$. Accordingly, at temperatures of at least about 300° F., and particularly at temperatures of about 700° F. and above which would be used in boilers or the like, elemental iron readily reacts with sulfur dioxide forming iron oxide, primarily ferrous oxide(FeO), and ferrous sulfide (FeS). As a result of iron's greater affinity for oxygen than nitrogen, reactions also take place with NO, $NO_2$ and other nitrogen oxides, the reaction products being $N_2$ and iron oxides, primarily FeO. Such reaction is promoted in the absence of excess oxygen, and the barring of a hydrocarbon or a carbohydrate in the combustion zone to usurp the excess oxygen is advantageous, as explained and demonstrated hereinafter. Moreover, both iron and FeO have a propensity to react with carbon monoxide, with iron and FeO forming iron carbide($Fe_3C$) while further oxidizing CO to $CO_2$. FeO also reacts with $CO_2$ to form $FeCO_3$(siderite) which is a stable compound, and such action proceeds readily at temperatures in the range of at least about 1000° F. that would be present in and just above the combustion zone.

As previously mentioned, the method also serves as a mercury emission control process that is particularly valuable when coal products are being burned that contain significant amounts of mercury. Mercury vaporizes at about 675° F. and thus is vaporized in the combustion zone when coal or some other coal product is being burned. However, it has been found that mercury and other heavy metals such as lead are sequestered by iron and/or iron oxide and has a propensity for adsorption onto the surface to form an amalgam-like formation that has a reddish tint and is sometimes referred to as "red iron"; red iron results from the adsorption onto and embrittlement of elemental iron and/or iron oxide, having a fair amount of stability and, because of its greater density, tends to fall downward into the ash chute.

Figure 1:
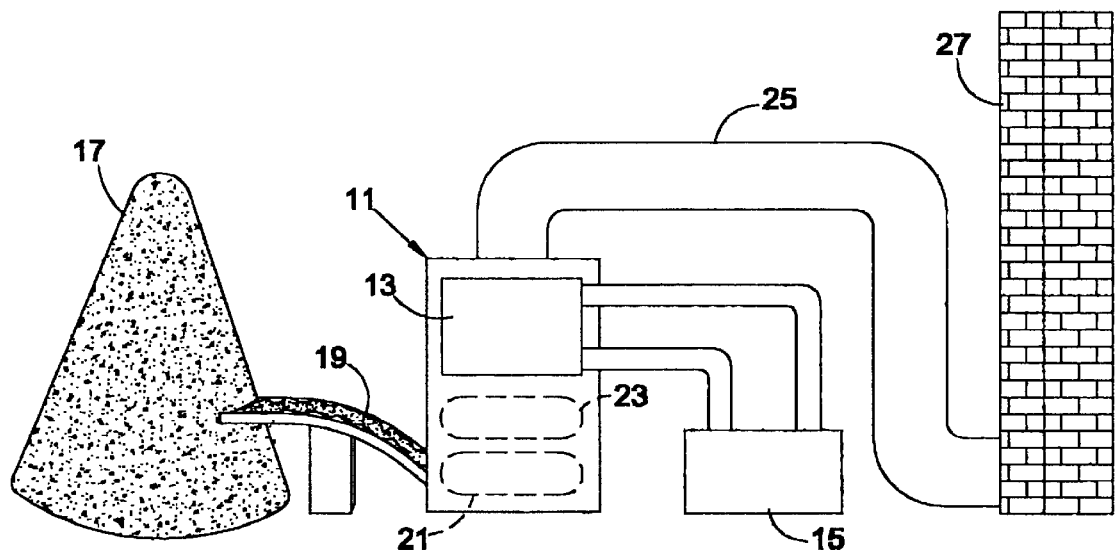
FIG. 1 is a schematic view showing a coal-fired boiler or furnace wherein a flue gas train carries the flue gas to a stack.

As illustrated in the various figures, the particulate iron can be introduced in various manners and at various locations depending upon the particular combustion process which is being adapted to reduce these undesired emissions. For example, in FIG. 1 there is shown a coal-fired boiler 11 wherein steam is created in the tube-type heat exchanger 13 and used to power steam turbines in an associated facility 15 to generate electrical energy, as schematically depicted. More specifically, granular coal is fed from supply piles 17 via a conveyor or stoker system 19 into a location in the boiler where it is burned in a combustion zone 21 using natural gas or some other fuel to start the combustion during start-up conditions.

Disposed between the combustion zone 21 and the heat exchanger 13 is what is referred to as a "rag layer" 23 which is a high temperature region. It is one location where particulate elemental iron is advantageously introduced, and reference is hereinafter made to the functioning of the rag layer in this environment. Nitrogen has five electrons in its outer incomplete shell and is capable of combining with other atoms at a variety of different valances. Diatomic nitrogen becomes stressed at the extremely high temperature which exist in the "rag layer" 23 and, as a result of this stressing, has the tendency to form different nitrogen oxides, including NO and $NO_2$. Thus, the introduction of elemental iron into this region is particularly helpful as iron exerts a stronger attraction for oxygen than does nitrogen.

The hot gaseous combustion products exiting the heat-exchanger tube bank or array 13 usually travel through suitable ducting 25 which constitutes a flue gas train and leads to a stack 27 for emission to the atmosphere. Of course, the overall system would usually include bag houses, cyclones, scrubbers and/or precipitators which form no part of the present invention and are not shown.

Figure 2:
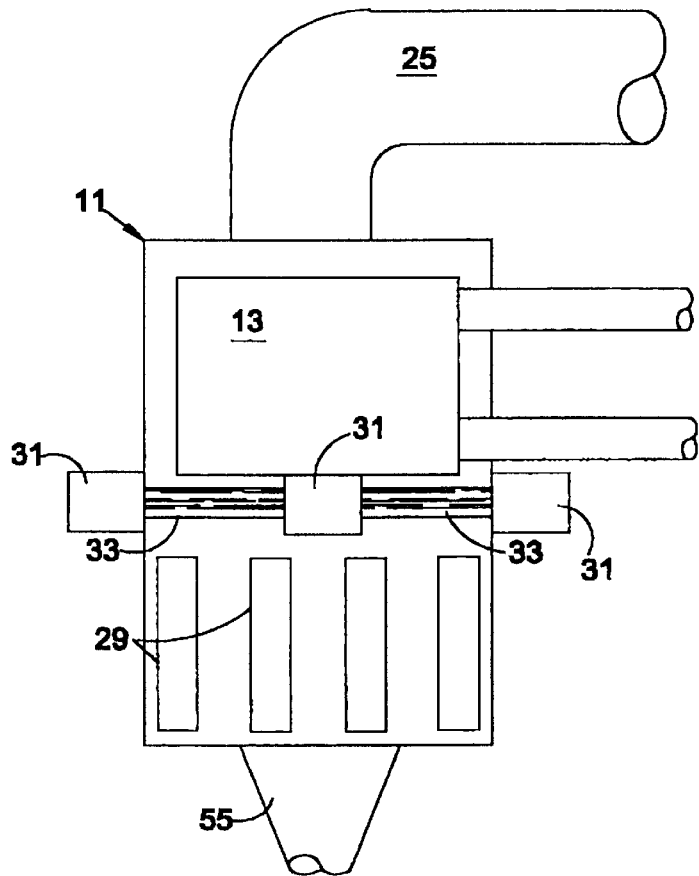
FIG. 2 is an enlarged schematic of a portion of FIG. 1 showing the components of the boiler in more detail.

There are various locations where particulate iron injection devices can be positioned, but preferably they are located between the burners which create the combustion zone 21 and the tubular heat exchangers 13. In FIG. 2, a plurality of wall burners 29 are schematically illustrated which would create a combustion zone 21, and immediately above the combustion zone, a plurality of particulate iron injectors 31 are installed on the exterior wall of the boiler 11. For example, four of them might be located at approximately 90° intervals to create curtains 33 of iron shavings that would fan out horizontally throughout the rag layer 23 region immediately below the heat exchanger tubes 13 creating a virtual curtain 33. To inject a sufficient quantity of particulate elemental iron into the center of the boiler 11, it may be desirable to assist in the delivery of the flakes that are being created, as by grinding wheels, by maintaining a slight overpressure of nitrogen within an outer compartment 35 (FIG. 4) so that it will also function as a carrier gas. Inasmuch as air is already 80% nitrogen, minor additional amounts of nitrogen are not considered significantly detrimental to the chemical balance.

On the other hand, as explained hereinafter, from the standpoint of reducing $NO_x$ generation, it has been found that the reduction of excess air and thereby the amount of nitrogen and oxygen that form $NO_x$. can be advantageous as discussed in more detail hereinafter. Accordingly, it may be advantageous to use a gaseous fuel material as a carrier for the particulate elemental iron to carry it into the rag layer, and candidates include gaseous fuels such as propane, butane or a heated, pressurized paraffin or other high molecular weight hydrocarbon, which will not only add BTUs but will consume some of the excess amount of oxygen that is being employed to smoothly burn coal or the like. Alternatively, instead of using a material that is gaseous at the operating temperature and can serve as a carrier, it has been found that the iron requirements can be supplemented by the use of a significant amount of such a hydrocarbon or a carbohydrate, such as sugar. As pointed out hereinafter, whereas a fairly major amount of the iron would otherwise be required to essentially eliminate $NO_x$, in the exhaust stream from a combustor where 4% or more excess air was used, a substantial part of this need can be supplied via the injection of a carbohydrate or the like into the rag layer. For example, by injecting a suitable amount of a carbohydrate, such as beet sugar or some other material that may be readily available at the combustor, in granular form, or as a liquid slurry including deionized water and an oxygen scavenger, or as a liquid molasses in the case of sugar, such will supplement the action of elemental iron in the rag layer in such an operation where excess air is being employed. The carbon from the carbohydrate or the hydrocarbon is oxidized reducing the oxygen available from the excess air so that it becomes unavailable to oxidize Fe. Thus, such significant reduction or elimination of the excess $O_2$ allows the Fe to perform its primary role of reducing $NO_x$.

Illustrated in FIGS. 4, 4A and 4B is a representative iron flake delivery device 31 which includes an outer compartment 35 that might be mounted on the sidewall of a boiler. Disposed within the compartment 35 would be a grinding wheel 37 mounted to rotate on a shaft supported in two bearings, which shaft is connected through a suitable seal to an electric motor 39 or the like mounted upon the exterior of the compartment 35 to power the grinding wheel 37. A supply of elemental iron in the form of iron wire 41 of the type used to create matting to reinforce concrete may be used. The iron wire 41 can be conveniently fed from a coil or reel 43 of such wire that is simply drawn therefrom by a pair of pinch rollers 45 or the like. The wire is fed into compartment 35 through a seal-protected opening in the sidewall thereof and into contact with the rotating grinding wheel 37. This creates a continuous stream of hot, thin iron shavings or flakes that exit the compartment 35 through a discharge opening 47, as a curtain of flakes being directed horizontally across the rag layer zone 23 in the boiler.

Figure 3:
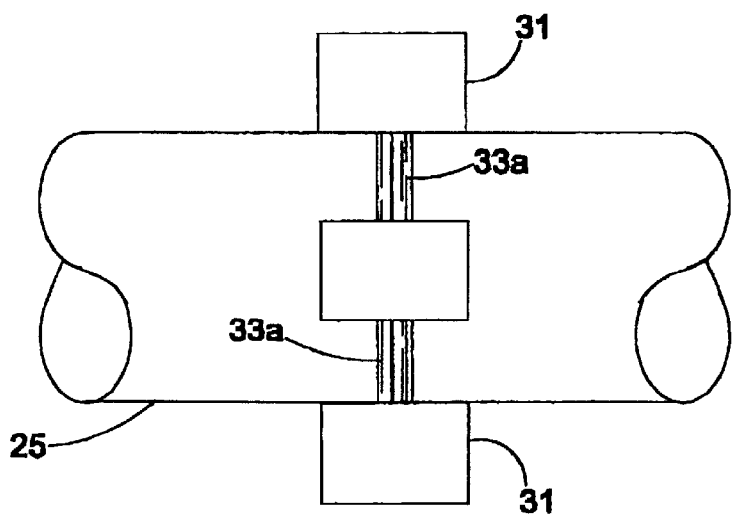
FIG. 3 is an enlarged fragmentary schematic view of another section of the FIG. 1 embodiment illustrating a section of the flue gas strain.

As earlier mentioned, in such a boiler operation embodying various features of the invention, it is preferred that there is injection of a curtain of particulate iron particles at a location in the rag layer 23 between the combustion zone 21 and the steam-generating heat exchange tubes 13. However, a secondary curtain of iron shavings can also be advantageously established in the flue gas train 25 above, i.e. downstream of, the boiler 11, but at a location where the temperature of the combustion products will still be sufficiently high that the desired chemical reactions will readily proceed. Depicted in FIG. 3 is a schematic representation that depicts a curtain of iron shavings 33a being injected across a horizontally, or vertically upward, flowing flue gas stream, again using four separate iron shavings injectors 31 located at 90° intervals about this ducting section 25 of the flue gas train. These four separate iron shaving injectors would create a curtain or blizzard of iron particles from four different angles; as a result, the particles injected in one direction would impinge upon particles injected from the other three injectors. This will provide an effective curtain for the removal of $SO_2$ also, and it will further operate to sequester any mercury vapor that might remain in the flue gas stream, by adsorption onto the impinging particles of iron. Moreover, if even further security against discharge of mercury is desired, a Ljungstrom pre-heater might be incorporated in combination along with appropriate iron flake injecting devices so that such elevation in temperature would aid in the adsorption of mercury onto elemental iron flakes to form the so-called "red iron".

Iron may also be dissolved in distilled water when the water is moving at a velocity of at least about of 7.4 feet per second and is at a temperature of 160° F. to 190° F. This provides a process for dissolving iron bar or rod, e.g. railroad rails or construction steel beams. The process is preferably first started with a concentration of 1% elemental iron powdered shavings, in a closed system to exclude the entrainment of oxygen. This dissolved iron process can produce an elemental iron slurry that can be utilized as a carrier for the injection of elemental iron into a boiler, e.g. at a concentration of 3 to 3.5 pounds of elemental iron per gallon of water. Boiler temperatures flash the water to steam, and the elemental iron attracts the oxygen of nitrogen dioxide, forming iron oxide and nitrogen. Alternatively, iron is dissolved in distilled water, and upon attaining a concentration of 3 to 3.5 pounds of elemental iron per gallon of water, is used to entrain air to utilize the oxygen of air to form 99% iron oxide, leaving 1% elemental iron. The resulting slurry of iron oxide and elemental iron may be injected from multiple sprays around a flue gas train, as a curtain across its circumference, where the flue gas temperature is about 300° F., i.e. just before a scrubber or cyclone. The iron oxide reacts with the carbon dioxide forming siderite, while the remaining 1% elemental iron converts any sulfur dioxide to iron sulfide.

Figure 5:
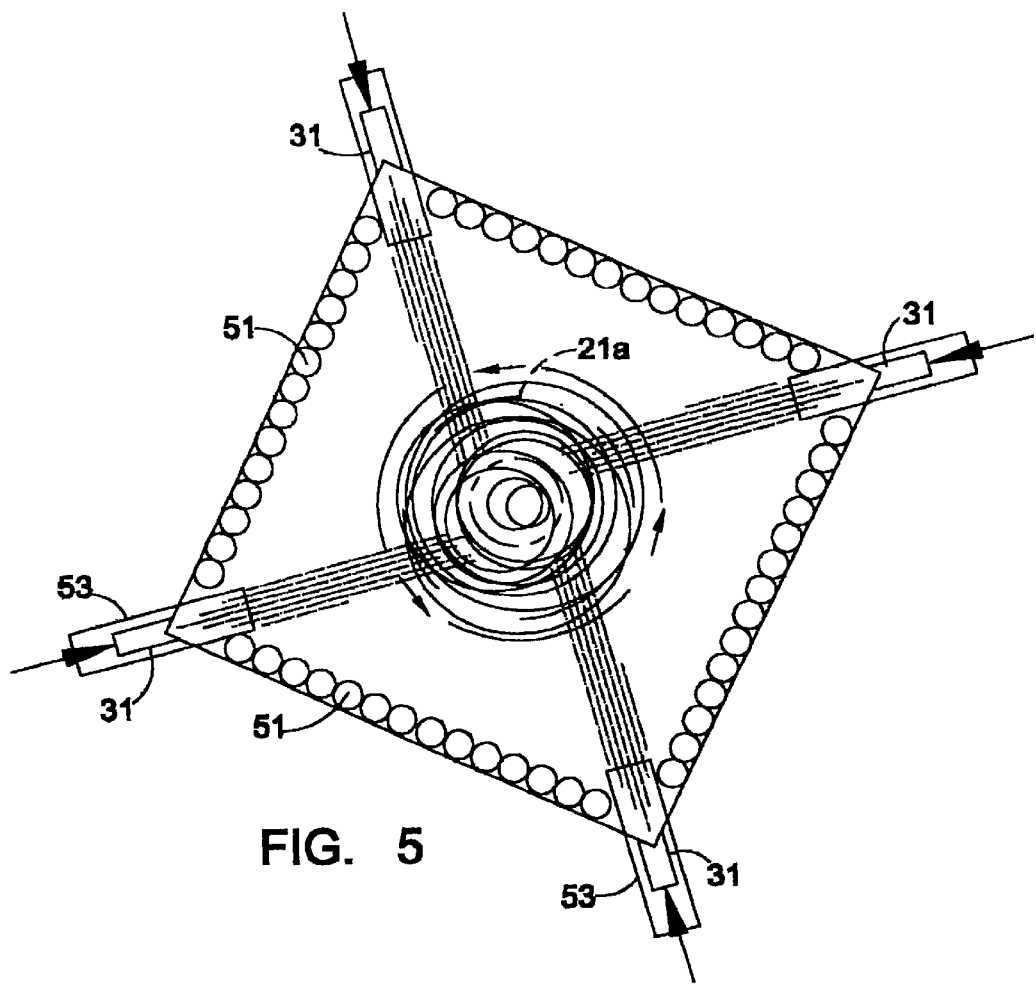
FIG. 5 is a schematic view to a boiler employing a tangential burner system.

As earlier indicated, the method of the invention is considered to be applicable to any type of burner system, including tangential-fired and stoker-fired systems, and to use with any type of coal product, including lignite. Illustrated in FIG. 5 is a slightly different type of burner system where the boiler combustion chamber includes banks of vertical heat exchange tubes 51 surrounding the region where combustion occurs, in addition to the usual horizontal steam-generating tubes in the region above the combustion zone. FIG. 5 shows four conduits 53, arranged at approximately 90° angles to one another, which inject air-pressurized pulverized coal into the combustion zone. Each pair of generally diametrically opposite injectors is offset slightly (from its opposite) so as to create a tangential flow pattern in the center of a combustion zone 21a that creates an efficient whirlwind type of effect, allowing heat to be efficiently absorbed in water flowing through the banks 51 of vertical heat exchange tubes as well as in the steam-generating horizontal tube bundles thereabove. In such an arrangement, four iron flake injectors 31 might be individually located so that one is positioned above each pulverized coal injector, as a result of which the iron shavings will be carried into an upper region of the combustion zone 21a by the burning coal streams, a particularly efficient arrangement that avoids any need for nitrogen gas injection.

Figure 6:
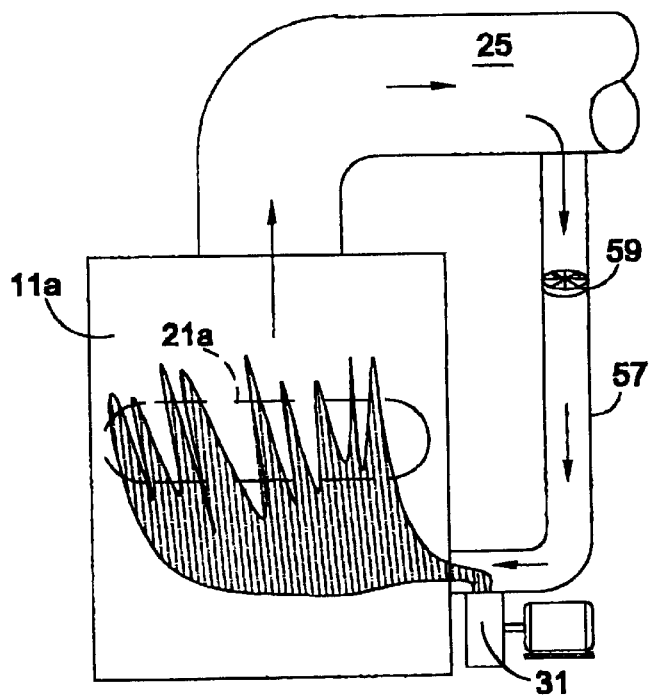
FIG. 6 is a schematic view generally similar to FIG. 2 showing an alternative embodiment of a combustor embodying various features of the invention.

FIG. 6 shows a boiler 11a that may be fed with a standard stoker-type coal supply system (not shown) wherein a substantial portion of the fuel gas stream exiting the top of the boiler is split off as a recycle stream via a side return conduit 57 containing a fan or blower 59 that takes suction from the flue gas train 25 and returns this side stream to the boiler at a location in the boiler sidewall slightly below the combustion zone 21a. This recycle arrangement provides a convenient method of delivering elemental iron flakes into the boiler by simply discharging them into the fast-moving recycle flue gas side stream which carries them into the combustion zone. This arrangement avoids the injection of additional nitrogen and is advantageous for this reason, as such nitrogen would require some sensible heat and also provide a potential further source of $NO_x$.

As depicted schematically in FIG. 2, ash and other solids from the combustion of coal or the like are removed by gravity through an ash chute 55 extending downward from the boiler combustion chamber. The various chemical reactions that occur in the combustion zone and in the surrounding regions and the hot flue gas streams are numerous, and they are more easily explained simply by reference to the ultimate reaction products rather than focusing upon the intermediate stages of these chemical reactions. Some of the high temperature, thin elemental iron flakes will oxidize, reacting with the oxygen provided by the excess air and forming FeO. FeO readily reacts with both CO and $CO_2$ at a temperature of about 700° F. and above, forming $Fe_3C$ with the former and $FeCO_3$(siderite) with the latter, both of which are solids and are removed through the ash chute. Any FeO that fails to so react may also exit through the ash chute or if small in size may be removed by scrubbers, bag filters, etc. As can be seen, these reactions will significantly reduce the amounts of CO and $CO_2$ in the flue gas stream resulting from the combustion of coal products or hydrocarbons. Of course, the key reactions of elemental iron are with $SO_x$ with $NO_x$, which is discussed in detail hereinafter. Sulfur, which is often present in coal products and in hydrocarbons, oxidizes readily to sulfur dioxide; however, at the present temperatures iron reduces $SO_2$, forming iron sulfide and FeO, the latter of which is then free to react with $CO/CO_2$.

There may be some moisture in the incoming fuel, and of course when a hydrocarbon is burned, one of the reaction products is water. Elemental iron undergoes a reversible reaction with water at these temperatures, mainly forming $Fe_3O_4$ and $H_2$, and it has been found that by injecting magnetite ($Fe_3O_4$), the material balance is effective to drive the reaction back and minimize the amount of $H_2$ creation while preserving elemental iron to carry out its primary mission. In addition, magnetite is effective to sequester Hg and heavy metals and thus serves a dual purpose, as described more hereinafter. Hydrogen gas can react with NO, forming ammonia plus additional water (which is then available to react with further iron), with some of the ammonia being converted to ammonium hydroxide. Ammonium hydroxide, hydrogen and $NO_2$ react to form ammonium nitrite, which is eventually chemically dissociated to nitrogen and water.

NO and $NO_2$ are the most common forms of $NO_x$, that are created in a coal-fired furnace boiler or a hydrocarbon-powered internal combustion engine or the like. Very generally, elemental iron reacts with NO forming FeO and $N_2$, and some further reaction of FeO and NO can create solid $Fe_2O_3$ (ferric oxide) and gaseous nitrogen. One particularly important reaction is that of elemental iron with $NO_2$ to ultimately form nitrogen and $Fe_3O_4$ (magnetite) which is a useful reaction product as mentioned just above.

Magnetite ($Fe_3O_4$), which is found naturally, may be optionally separately injected as a part of an overall method for reducing undesirable emissions. The optional feeding of magnetite into a boiler or combustor, for example at a location just above the coal supply location and just below the major combustion zone, has an effect of sequestering Hg and heavy metals and to some extent deterring $SO_2$ production below the hot combustion zone. Iron and heavy metal sulfides are formed that remain as stable solids which are normally removed via the ash chute. Thus, it may be desirable to inject a stream of particulate magnetite at a location below the heat exchange tubes of a boiler and preferably below the rag layer.

Solid iron oxide reaction products are usually removed along with the ash and other solid reaction products through the ash chute 55. However, some small particles of iron oxide will be entrained in the flue gas, and they are normally removed from the flue gas train by conventional solid removal techniques, such as cyclones, scrubbers, bag houses, precipitators or a combination of the foregoing.

From a basic material balance standpoint, for example, three moles of elemental iron are required to eliminate each mole of $SO_2$ emissions. In perspective, a pound-mole of elemental iron weighs about 55.85 pounds whereas one pound-mole of $SO_2$ weighs about 64 pounds. In this application, it should be understood that whenever "mole" is used, it is meant to indicate a pound-mole (# mole). Therefore, if a boiler or furnace produces 100 tons (200,000 English pounds) of $SO_2$ per year, which is equal to about 22.8 pounds per hour of $SO_2$, about 59 pounds per hour of elemental iron, reacting completely, should remove 100% of the $SO_2$ emissions.

Again from a basic material balance standpoint, 4 moles of elemental iron can react with 6 moles of NO to form $Fe_2O_3$ and $N_2$. Thus, if each mole of NO weighs 30 pounds and if a boiler or furnace produces 100 tons (200,000 pounds) of NO per year (assume 22.8 pounds per hour of NO), this would be equal to 0.76 mole per hour of NO, requiring ⅔ of a mole of Fe to react with each mole of NO. Thus, 100% of such NO emissions could be eliminated by the complete reaction of 0.51 mole per hour of elemental iron, which is equal to about 28.3 pounds per hour of elemental iron. If under the conditions of operation the primary reaction was $2Fe+2NO \rightarrow 2FeO+N_2$, then a proportionately larger amount of Fe would be required.

Nitrogen dioxide emissions require 3 moles of elemental iron to reduce each 2 moles of $NO_2$ assuming $Fe_3O_4$ is produced. Thus, if 1# mole of $NO_2$ is equal to 46 pounds and if a boiler or furnace is producing 100 tons per year of $NO_2$ or 22.8 pounds (0.496 mole) per hour, it will require about 0.74 mole per hour of elemental iron, or about 41.5 pounds per hour of iron flakes, to reduce such $NO_2$ to $N_2$ and create $Fe_3O_4$. If under the conditions of operation the primary reaction was $2Fe+NO_2 \rightarrow FeO+N_2$, then a proportionately larger amount of Fe would be required.

As previously mentioned, the invention is considered to also be applicable to a combined-cycle combustion turbine arrangement to reduce $NO_x$, CO and $CO_2$ emissions therefrom. The hot high pressure gas stream leaving such a combustor and traveling to the turbine can be provided with a curtain of particulate elemental iron in a suitable manner as described above, as by providing a plurality of the previously described grinders/flakers for cutting or abrading thin slices of elemental iron from a relatively soft iron wire or rod. It has been found that the use of such a curtain of particulate iron can eliminate the need for the injection of water, which is commonly now used as a limiting reactant in order to reduce the quantity of $NO_x$ created in the combustion zone. Such elimination of water reduces potential hydrogen embrittlement of the turbine blades and will improve combustion conditions and efficiency and lengthen the lifetime of the equipment. Alternatively, because the exhaust gases from such a turbine are still at a sufficiently high temperature that the reactions with elemental iron that reduce the $NO_x$, CO and $CO_2$ levels will proceed, such iron flake injections may be carried out downstream of the turbine if desired.

Figure 7:
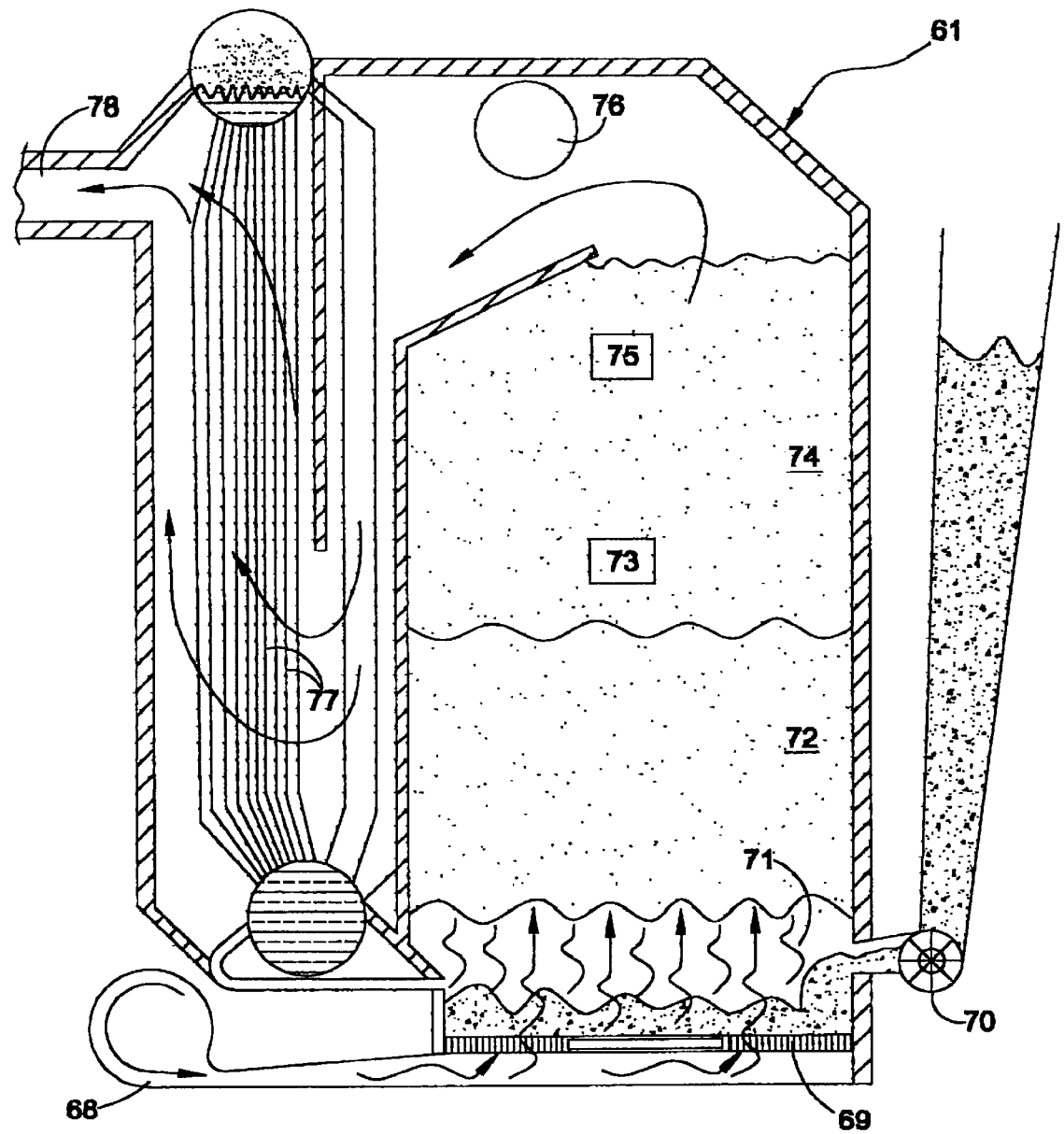
FIG. 7 is a view similar to FIG. 2, representing a stoker boiler wherein a method embodying various features of the invention for controlling the stack emission of NO$_x$ by utilizing only the stoichiometric amount of air in the combustion of coal might be employed.

Depicted schematically in FIG. 7 is a boiler 61 wherein a blower 68 injects a stoichiometric amount of primary air upward through a coal bed shaker 69 in a reactive area 71 where destructive distillation of coal from a bunker coal injector 70 occurs, producing gasified coal. The gasified coal is ignited near the bottom of the combustion zone 72, producing $NO_2$, $CO_2$ and $SO_2$, and other gases.

By injecting elemental iron through a boiler-porthole 73 in what will be a bottom region of the "rag" layer 74, that would have the appearance of a gaseous haze, oxygen is attracted away from $NO_2$ to form iron oxide (FeO). By injecting pure oxygen through a boiler-porthole 75 in an upper region of the "rag" layer 74, such oxygen burns whatever carbon remains, producing additional BTUs and eliminating potential smoke. This arrangement produces a superheated translucent gaseous mixture in the general area where one or more soot blowers 76 are located, prior to the mixture passing through the heat exchanger tubes 77 and ultimately exiting through a flue 78 that would likely contain a dust collector, as known in this art.

FIG. 7 shows the substantial size of the area located in proximity of the soot blowers 76, between the top of the "rag" layer 74 and the heat exchanger tubes 77, wherein the injected oxygen that has already mixed with the carbon of incomplete combustion will oxidize that carbon to $CO_2$. This overall arrangement increases the effective BTUs of combustion because there has been a reduction in the BTUs that would otherwise be required to heat excess nitrogen because less air is being used, and moreover, there is an elimination or at least a very great reduction of soot and stack smoke exhaust.

Figure 8:
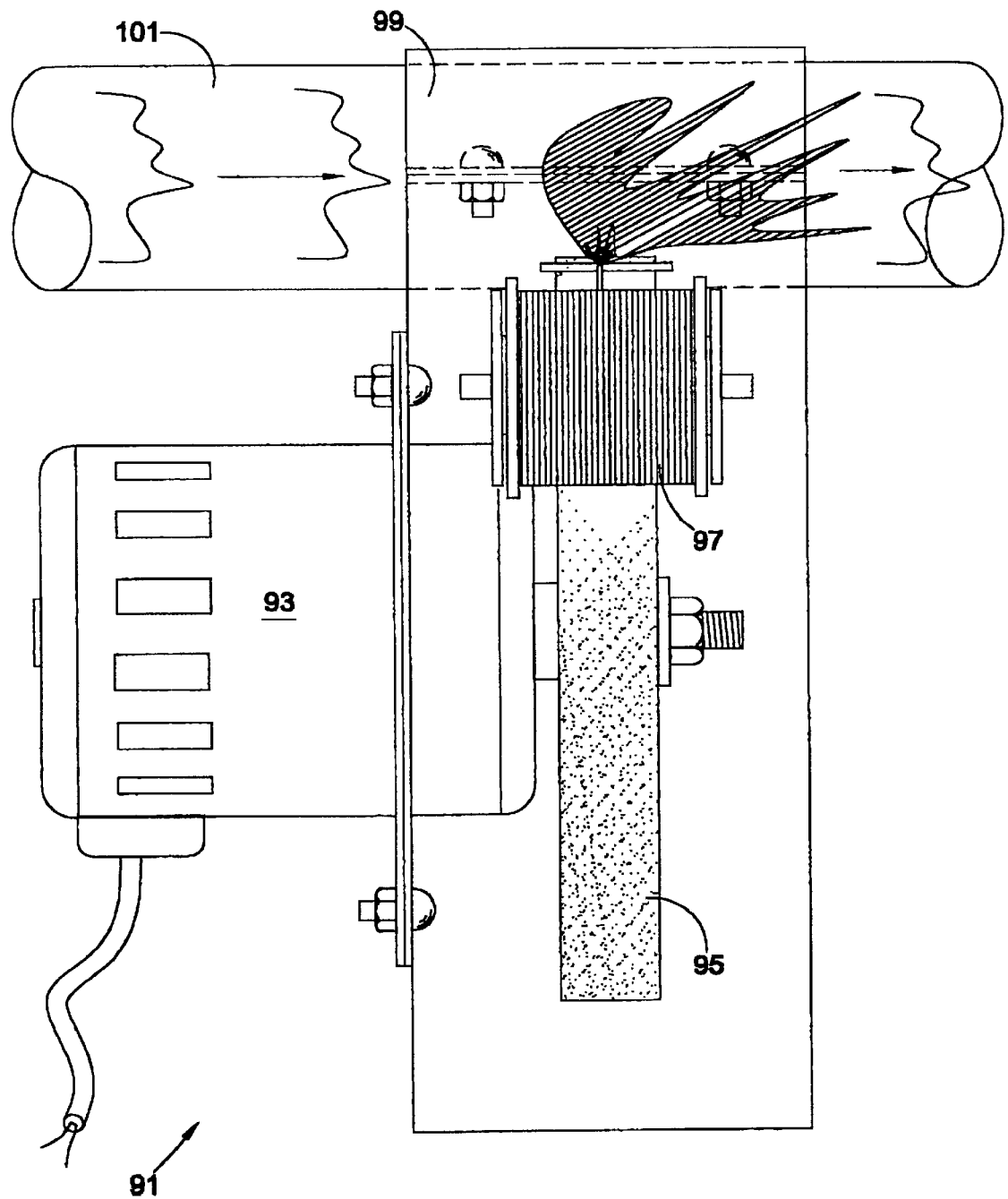
FIG. 8 is a schematic view illustrating a method for controlling NO$_x$ in combustion products from an internal combustion engine embodying various features of the invention.

Depicted in FIG. 8 is a schematic representation as to how the method might be employed to treat the exhaust stream from an internal combustion engine, for example, an IC engine burning gasoline, methane, propane or the like, or a compression cycle engine such as a diesel engine, to reduce $NO_x$, CO and $CO_2$ in the exhaust being discharged to the atmosphere. It is contemplated that a suitable small iron-flaking unit 91 could be driven by a 12-volt electric motor 93 operating off the electrical system of the vehicle, or any associated electrical system if the internal combustion engine were being used under stationary conditions. The motor 93 would drive a grinding wheel 95 and also drive a pair of pinch rollers (not shown) that would feed wire from a reel or spool 97 mounted thereadjacent. The unit 91 might be mounted as by clamping via a bracket 99, in surrounding relationship about the exhaust conduit 101 from an internal combustion gasoline engine, and it could take the place of the present catalytic converter found on U.S. automobiles, or it could be located downstream thereof. There would be an opening provided adjacent the grinding wheel 95 so that the flakes of elemental iron, shaved from the wire, would be fed as a curtain across the stream of exhaust gases exiting the tailpipe. The unit 91 would be controlled so that it would operate at any time that the engine was running and the temperature of the exhaust gases in the conduit 101 had reached a certain minimum temperature, i.e. about 300° F.

For purposes of providing some general examples of the resources needed for carrying out the method of the invention with respect to the combustion of different fuels, i.e. coal, fuel oil and natural gas, the examples provided immediately hereinafter are set forth.

Examples 1, 2 and 3 indicate the comparative quantities of elemental iron required to reduce or eliminate $NO_x$ emissions from the combustion of three different fuel types, each being burned in an amount to generate 1,000,000 BTU. Example 4 is based upon actual values of $NO_x$ being produced during an average day at an existing sugar plant boiler. The different calculations show the effects of different amounts of excess air being utilized in combustion, and the amount of elemental iron required to reduce or eliminate $NO_x$. The following abbreviations are sometimes used: th=Theoretical; i=Internal; e=External.

EXAMPLE 1

It is of course realized that the carbon, hydrogen and sulfur content of coal can vary quite widely; however, for purposes of these calculations, the analysis is provided on page 56 of "Fuels and Combustion" by Smith et al., McGraw Hill Book Co., 1952, is employed. It indicates that a representative coal might contain 72% carbon, 8% oxygen, 6% hydrogen, 1.6% sulfur and 1.4% nitrogen, with the remainder being ash. From this it can be calculated that, to oxidize all of the carbon in 100 lbs of such coal to $CO_2$, all of the hydrogen to $H_2O$ and the sulfur to $SO_2$, would require about 7.3 moles of oxygen; moreover, such stoichiometric combustion of the carbon, hydrogen and sulfur would produce 1,383,263 BTUs. By proportionally reducing these amounts to 1,000,000 BTUs, one obtains about 72.29 lbs of coal, the composition of which would equal the following numbers of # moles: 4.3374 moles C+2.1687 moles $H_2$+0.1807 mole $O_2$+0.03395 mole $N_2$ and 0.03615 mole S that would burn to produce 1,000,000 BTUs. Next, two assumptions are made: (1) that the coal might contain 0.001 mole of hydrogen cyanide(HCN) and (2) that it could be burned with 0% excess air. The carbon and hydrogen in the HCN are arbitrarily deducted from the moles of C and $H_2$ mentioned above. The theoretical amount of oxygen that would be required (in addition to the amount of oxygen already present in the coal) is then calculated to be 5.2794 moles of $O_2$(th), which would carry along with it about 19.8504 moles of $N_2$(e) based upon the normal composition of air. The end result of such theoretical, complete combustion, using the stoichiometric amount of air needed, would be 4.3374 moles $CO_2$+2.1687 moles $H_2O$+0.03615 mole $SO_2$+ 0.022 mole $NO_2$ and 19.8855 moles $N_2$ and substantially no NO.

Under normal conditions during a boiler start-up, air is normally injected at a rate about 50% in excess of the stoichiometric amount for combustion safety until the boiler has reached operating temperatures. Thereafter, a recycle flue gas sidestream, as depicted in FIG. 6, may often be employed so that some of this excess air will be burned. Moreover, such recycle stream will sometimes also be used to carry fuel into the combustion zone of a tangential-fired boiler or the like; moreover, the ancillary burning of some methane or butane may be used so that the amount of excess air can generally be quickly reduced to only about 4% of the theoretical stoichiometric amount.

Once stable operation at 4% excess oxygen is reached, the following material balance would be indicative: 4.3352 moles C+2.1677 moles $H_2$+5.4905 moles (th)$O_2$ (from 4% excess air)+0.1786 mole internal $O_2$+0.03505 mole internal $N_2$+20.6445 moles $N_2$ (from air)+0.03615 mole S+0.0022 mole HCN would produce 4.3374 moles $CO_2$+2.1687 moles $H_2O$+0.03615 mole $SO_2$+0.0022 mole $NO_2$+0.0034 mole NO+20.6778 moles $N_2$ and 0.2112 mole $O_2$. Based upon these calculations for 4% excess air, the following represents the end result which injection of 0.4313 mole of iron would have in changing the exhaust stream to:

4.3374 moles $CO_2$+2.1687 moles $H_2O$+0.03615 mole $SO_2$+ 20.6806 moles $N_2$ and substantially no $O_2$, along with the creation of 0.4313 mole of solid FeO.

As a further alternative, by careful control it has been possible to carry out what is sometimes termed a super restrictive coal boiler operation using only 1% excess air. Such operation would provide the following material balance:

4.3352 moles C+2.1677 moles $H_2$+5.3322 moles (th)$O_2$ (from air)+0.1786 mole internal $O_2$+0.03505 mole internal $N_2$+20.04894 moles $N_2$ (from air)+0.03615 mole S+0.0022 mole HCN would produce 4.3374 moles $CO_2$+ 2.1687 moles H2O+0.03615 mole $SO_2$+0.0022 mole $NO_2$+0.00085 mole NO+20.08356 moles $N_2$ and 0.5280 mole $O_2$. It can be seen that under such conditions the amounts of $NO_2$ and NO are slightly less than when 4% excess air is used. Then, the injection of a sufficient amount of elemental iron (0.1108 mole) acts to convert the NO and $NO_2$ to $N_2$, while creating FeO to produce the following:

4.3374 moles $CO_2$+2.1687 moles $H_2O$+0.03615 mole $SO_2$+ 20.0851 moles $N_2$+0.1108 mole FeO and substantially no $O_2$.

Calculations show that the addition of the amounts of iron set forth in Table 1 hereinafter for each 1,000,000 BTU output will substantially completely eliminate $NO_x$, in the exhaust gas stream.

TABLE 1

Fe lbs per 1,000,000 BTUs

| Excess Air | | Fe lbs |
|---|---|---|
| 0% | = | 00.24 |
| 1% | = | 05.99 |
| 4% | = | 23.29 |
| 8% | = | 46.22 |
| 16% | = | 92.20 |

The figures in the table above of course show that suppression of $NO_x$, generation by injection of particulate elemental iron is more economical when lower amounts of excess air are used in the combustion operation.

EXAMPLE 2

A comparative set of calculations is also provided for the combustion of No. 6 fuel oil. For reference purposes, such fuel oil is considered to have an average composition of $C_{16}H_{24}$ and to be burned to create a 700° F. stack temperature and with the use of 20% excess air. For purposes of calculation, one mole of this fuel oil would require 22 moles of $O_2$ and would produce 16 moles of carbon dioxide and 12 moles of water with zero stoichiometric excess of air. The 22 moles of oxygen would be accompanied by about 82.76 moles of nitrogen from the air that is being burned. Based upon the heating value of the oil, it is calculated that 0.264 mole of the oil would produce 1,000,000 BTUs, and for comparison purposes this would be equal to about 6.67 gallons of the #6 fuel oil. The steam atomization of oil at the burner emulsifies some oil causing surface polarization of the external oil film on the water/steam droplets which attracts nitrogen onto the #6 fuel oil droplets, resulting in an average of about 0.0022 mole of nitrogen (0.0011 mole of $N_2$) per 1,000,000 BTUs. This amount of nitrogen results in oxidation to about 0.0022 mole of $NO_2$ and varying amounts of NO which are proportional to the amount of excess air that is used.

Assuming operation under conditions where 4% excess of air was employed for 0.264 mole of $C_{16}H_{24}$, the following material balance would result:

0.264 mole $C_{16}H_{24}$+6.0426 moles $O_2$+22.7203 moles $N_2$ (air)+0.0011 mole $N_2$(i) produces 4.224 moles $CO_2$+3.168 moles $H_2O$+22.7185 moles $N_2$+0.00337 mole NO+0.0022 mole $NO_2$+0.2307 mole $O_2$. Practice of the $NO_x$ suppression method by the injection of 0.4692 mole of elemental iron into the combustion zone for this combustion with 4% excess air would result in changes in the product stream set forth above to the following:

4.224 moles $CO_2$+3.168 moles $H_2O$+22.7213 moles $N_2$+0.4692 mole FeO.

For comparison purposes, the same calculations are made for conditions of operation as a super restrictive oil boiler operation employing only 1% excess air. They would result in the following material balance:

0.264 mole $C_{16}H_{24}$+5.8683 moles $O_2$+22.0648 moles $N_2$ (air)+0.0011 mole $N_2$ would produce 4.224moles $CO_2$+3.168 moles $H_2O$+22.0644 moles $N_2$+0.000843 mole NO+0.0022 mole $NO_2$+0.05768 mole $O_2$. By employing the $NO_x$, emission reduction method and using only 0.1206 mole of elemental iron flakes, one obtains the following:

4.224 moles $CO_2$+3.168 moles $H_2O$+22.0659 moles $N_2$+0.1206 mole FeO and no $O_2$.

Calculations show that the addition of the amounts of iron set forth in Table 2 hereinafter for each 1,000,000 BTU output will substantially completely eliminate $NO_x$, in the exhaust gas stream.

TABLE 2

Fe lbs per 1,000,000 BTUs

| Excess Air | | Fe lbs |
|---|---|---|
| 0% | = | 0.24 |
| 1% | = | 6.51 |
| 4% | = | 25.34 |
| 8% | = | 50.44 |
| 16% | = | 101.28 |
| 20% | = | 125.74 |

The figures in the table above of course show that suppression of $NO_x$, generation by injection of particulate elemental iron is more economical when lower amounts of excess air are used in the combustion operation.

EXAMPLE 3

A further comparative set of calculations is also provided for the combustion of methane (natural gas). For reference purposes, methane is $CH_4$ and can be burned with varying percentages of excess air. For purposes of calculation, one mole of methane would require 2 moles of $O_2$ and would produce 1 mole of carbon dioxide and 2 moles of water with zero stoichiometric excess of air. The 2 moles of oxygen would be accompanied by about 7.52 moles of nitrogen from the air that is being burned. Based upon the heating value of the gas, it is calculated that 2.9 moles of $CH_4$ would produce 1,000,000 BTUs.

Assuming operation under conditions where 4% excess of air was employed for 2.9 moles of $CH_4$, the following material balance would result:

2.9 moles $CH_4$+5.8602 moles $O_2$+22.6889 moles $N_2$ would produce 2.9 moles $CO_2$+5.8 moles $H_2O$+22.6861 moles $N_2$+0.00337 mole NO+0.0022 mole $NO_2$+0.2304 mole $O_2$. Practice of the $NO_x$ suppression method by the injection 0.4692 mole of elemental iron into this combustion with 4% excess air would result in changes in the product stream set forth above to the following:

2.9 moles $CO_2$+5.8 moles $H_2O$+22.6889 moles $N_2$+0.4530 mole FeO.

For comparison purposes, the same calculations are made for conditions of operation as a super restrictive oil boiler operation employing only 1% excess air. They would result in the following material balance:

2.9 mole $CH_4$+5.8 moles $O_2$+22.03443 moles $N_2$ would produce 2.9 moles $CO_2$+5.8 moles $H_2O$+22.03291 moles $N_2$+0.000843 mole NO+0.0022 mole $NO_2$+0.0576 mole $O_2$. By employing the $NO_x$, emission reduction method using only 0.1164 mole of elemental iron flakes, one obtains the following:

2.9 moles $CO_2$+5.8602 moles $H_2O$+22.03443 moles $N_2$+0.1164 mole FeO and substantially no $O_2$.

Calculations show that the addition of the amounts of iron as set forth in Table 3 hereinafter for each 1,000,000 BTUs which will substantially completely eliminate $NO_x$ in the exhaust gas stream.

TABLE 3

Fe lbs per 1,000,000 BTUs

| Excess Air | | Fe lbs |
|---|---|---|
| 0% | = | 0.24 |
| 1% | = | 6.50 |
| 4% | = | 25.30 |
| 8% | = | 50.37 |
| 16% | = | 100.50 |
| 20% | = | 125.57 |

EXAMPLE 4

270 tons of coal are burned daily, producing about 235 therms per ton (1 therm=100,000 BTUs), and 1,694.64 lbs of $NO_x$ are generated each day. 1,694.64 lbs of $NO_x$ per day/24 hrs=70.61 lbs/hr of $NO_x$. (270 tons of Coal/24 hrs)×2000 lbs/ton=22,500 lbs/hr which would produce 264,375,000 BTUs/hr, i.e. about 11,750 BTUs/lb. 70.61 lbs/hr of $NO_x$/22,500 lbs/hr of coal=0.3138 lb of $NO_x$/100 lbs of coal.

Plant records show that operation of the plant to burn 270 tons of coal daily is carried out using about 6.5% excess air, and as indicated above, the combustion of 100 lbs of this coal produces 0.3138 lb of $NO_x$. Moreover, analysis shows that the 0.3138 lb averages about 0.1943 lb of NO and about 0.1195 lb of $NO_2$. Calculations also show that changes in the amount of excess air results in changes in the amount of NO, with the amount of $NO_2$ remaining essentially constant. The following tables show the varying amounts of NO and $NO_2$ as the amount of excess air is varied.

| % Excess Air | NO lbs/ 100 lbs Coal | # Moles NO | Wt $NO_2$ | # Moles $NO_2$ |
|---|---|---|---|---|
| 0 | 0.0000 | 0.00000 | 0.1195 | 0.0026 |
| 4 | 0.1195 | 0.00398 | 0.1195 | 0.0026 |
| 6.5 | 0.1943 | 0.00648 | 0.1195 | 0.0026 |
| 8 | 0.2390 | 0.00297 | 0.1195 | 0.0026 |
| 16 | 0.4780 | 0.01593 | 0.1195 | 0.0026 |

On the assumption that the coal contains a minor amount of hydrogen cyanide (0.0026 mole), the following calculations are made on the basis that all of the nitrogen in the HCN will be oxidized to $NO_2$:

$2HCN+4.5O_2 \rightarrow H_2O+2CO_2+2NO_2$=(0.0026)×[HCN+ 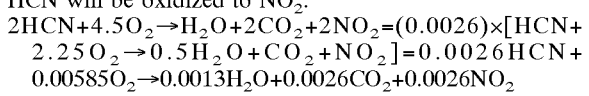 $=0.0026HCN+$
$0.00585O_2 \rightarrow 0.0013H_2O+0.0026CO_2+0.0026NO_2$

| Dry Ultimate Analysis Basis of 100 lbs of Coal: | | | | Required Theoretical $O_2$ for Combustion |
|---|---|---|---|---|
| Element | lb/100 lbs of Coal | Mole Wt | # Moles/100 lbs of Coal | # Moles/100 lbs Coal |
| C | = 75.90 | 12 | 6.325 | 6.3250 |
| $H_2$ | = 5.40 | 2 | 2.700 | 1.3500 |
| $O_2$ | = 8.16 | 32 | 0.255 | −0.2550 |
| $N_2$ | = 1.45 | 28 | 0.0518 | 0.0026(HCN) |
| S | = 0.46 | 32 | 0.0144 | 0.0144 |
| Ash | = 8.63 | | | |
| Total | = 100.00 | | | 7.437 |

Moles/100 lbs of Coal (1,175,000 BTUs):

| | | |
|---|---|---|
| C | = | 6.325 |
| $H_2$ | = | 2.7 |
| $O_2$(i) | = | 0.255 |
| $O_2$(i)-$O_2$(HCN) | = | 0.24912 |
| $N_2$(i) | = | 0.0518 |
| $N_2$(i)-$N_2$(HCN) | = | 0.0505 |
| S | = | 0.0144 |
| HCN | = | 0.0026 |

The following analyses shows material balances for 100 lbs of coal based upon combustion using 0% to 16% excess air, on the input side:

Ultimate Analysis+Theoretical Air/Case Percentage of Excess Air:

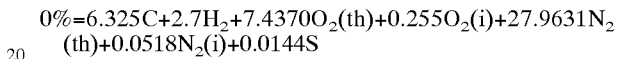
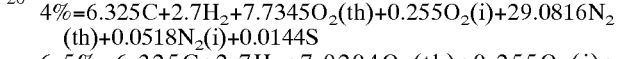
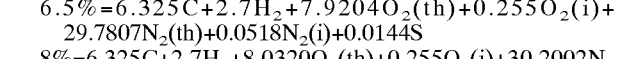
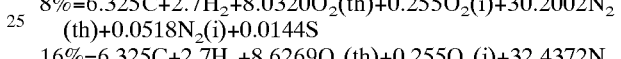
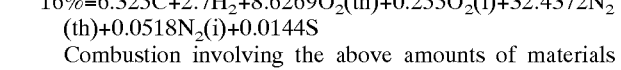

Combustion involving the above amounts of materials from burning 100 lbs of coal would result in the amounts of $N_2$, NO, $NO_2$ and $O_2$ in the exhaust stream as set forth in Table A below, with the assumption that all of the additional nitrogen oxidized would create NO. Actual sample calculations for 0 and 4% excess air follow the table.

TABLE A

NO & $NO_2$ Production Matrix (per 100 lbs of Coal) (amounts given in #moles):

0% = 28.0136 $N_2$ + 0.0000 NO + 0.0026 $NO_2$ + 0.0000 $O_2$
4% = 29.1301 $N_2$ + 0.0040 NO + 0.0026 $NO_2$ + 0.2955 $O_2$
6.5% = 29.8280 $N_2$ + 0.0065 NO + 0.0026 $NO_2$ + 0.4802 $O_2$
8% = 30.2467 $N_2$ + 0.0080 NO + 0.0026 $NO_2$ + 0.5922 $O_2$
16% = 32.4797 $N_2$ + 0.0160 NO + 0.0026 $NO_2$ + 1.1819 $O_2$

0% Excess Air:
(6.325−0.0026) C+(2.7−0.0013) $H_2$+7.437$O_2$(th)+0.255$O_2$ (i)+27.9631$N_2$(th)+(0.0518−0.00013) $N_2$(i)+0.0144S+ 0.0026HCN→6.325$CO_2$+2.7$H_2O$+28.0136$N_2$+ 0.0144$SO_2$+0.0026$NO_2$ 4% Excess Air (The Optimal Amount of Excess Air for Maximum $NO_x$ Reduction):

$6.3224C+2.6987H_2+7.7345O_2(th)+0.255O_2(i)+29.086N_2(th)+0.0505N_2(i)+0.0144S+0.0026HCN \rightarrow 6.325CO_2+2.7H_2O+29.1301N_2+0.0144SO_2+0.0026NO_2(i)+0.0040NO+0.2955O_2$ Table B below shows the number of moles of iron necessary in each instance to reduce the NO and $NO_2$ to $N_2$ and the resultant amount of $N_2$. Sample calculations are first provided which reflect the change Fe has on the content of the exhaust streams for combustion with 0% excess air and 4% excess air, with amounts given in moles.

With injection of elemental iron $NO_2$ in the exhaust stream from combustion with 0% excess air is reduced as follows:

$6.325CO_2+2.7H_2O+28.0136N_2+0.0144SO_2+0.0026NO_2+0.0052Fe \rightarrow 6.325CO_2+2.7H_2O+28.0149N_2+0.0144SO_2+0.0052FeO$ With injection of elemental iron NO and $NO_2$, in the exhaust stream from combustion with 4% excess air are reduced as follows:

$6.325CO_2+2.7H_2O+29.1301N_2+0.0144SO_2+0.0026NO_2(i)+0.004NO+0.2956O_2+0.6002Fe \rightarrow 6.325CO_2+2.7H_2O+29.1334N_2+0.0144SO_2+0.6002FeO$

TABLE B (amounts given in # moles)
NO & $NO_2$ Reduction Matrix (per 100 lbs of Coal):

| | |
|---|---|
| 0% | = 0.0052 Fe→28.0149 $N_2$ + 0.0052 FeO |
| 4% | = 0.6002 Fe→29.1334 $N_2$ + 0.6002 FeO |
| 6.5% | = 0.9720 Fe→29.8325 $N_2$ + 0.9720 FeO |
| 8% | = 1.1977 Fe→30.2520 $N_2$ + 1.1977 FeO |
| 16% | = 2.3850 Fe→32.4890 $N_2$ + 2.3850 FeO |

It should be understood that, in each instance, the boiler would be started with an additional amount of excess air, perhaps as much as 50% excess air; however, once it is brought up to boiler temperature, the excess air would be reduced to the amount set forth and would remain at this average amount for continuous operation thereafter.

Based upon the foregoing figures, for such a plant burning 22,500 lbs per hour of coal, which would be generating about 70.61 lbs per hour of $NO_x$, the following amounts of elemental iron set forth in Table C would be required in lbs per hour, for 0 to 16% excess air.

TABLE C (Fe lbs per 264,375,000 BTU/hr)

| | | |
|---|---|---|
| 0% | = | 66 |
| 4% | = | 7,549 |
| 6.5% | = | 12,226 |
| 8% | = | 15,065 |
| 16% | = | 29,998 |

The figures in Table C are based upon an output of about 264,375,000 BTUs per hour; the proportional amounts that would be required for an output of 1,000,000 BTUs per hour are set forth in Table D.

TABLE D (Fe lbs per 1,000,000 BTU)

| | | |
|---|---|---|
| 0% | = | 0.3 |
| 4% | = | 28.6 |
| 6.5% | = | 46.3 |
| 8% | = | 57.0 |
| 16% | = | 113.5 |

Furthermore, it can be shown that, if $Fe_3O_4$ were added to the boiler, such could reduce the amount of elemental iron required to eliminate $NO_x$ by about 50%. Very generally, it can be seen from the above that, although 4% of excess air is often felt to be mandated for operational safety purposes in boilers, it results in the generation of nearly double the amount of NO, and for each additional 4% of excess air, the amount of NO essentially increases by the same increment, while the $NO_2$ remains substantially constant. Above 16% excess air there are some decreases in temperature which would have an effect upon the stressing of the diatomic molecules in the rag layer. Thus, amounts might not thereafter be directly proportional; however, commercial operation is seldom carried out using such amounts.

However, by injecting a suitable amount of beet-sugar, either in granular form or as a molasses liquid, either separately or combined with a suitable amount of elemental iron, in a region just above the combustion zone, excess air can be reduced by burning the sugar. The carbon from the sugar will burn using some of the excess oxygen from the air. This will allow a greater percentage of the elemental iron being injected to reduce $NO_x$, one of its primary objectives which occurs because elemental iron has a stronger attraction to the oxygen of $NO_2$ and NO than does the nitrogen. The following formulas demonstrate mole amounts of sugar and elemental iron that will accomplish such oxygen reductions and reduce the quantities of $NO_x$. in the flue gas train.

4% Excess Air Combustion and Resulting Fe Required for $NO_x$, Reduction:

$6.325CO_2+2.7H_2O+29.1301N_2+0.0144SO_2+0.0026NO_2+0.004NO+0.2955O_2+0.0092Fe+0.025C_{12}H_{22}O_{11} \rightarrow 6.6205CO_2+2.9709H_2O+29.1334N_2+0.0144SO_2+0.0092FeO$ 6.5% Excess Air Combustion and Resulting Fe Required for $NO_x$ Reduction:

$6.325CO_2+2.7H_2O+29.8280N_2+0.0144SO_2+0.0026NO_2+0.0065NO+0.4802O_2+0.0117Fe+0.04C_{12}H_{22}O_{11} \rightarrow 6.8052CO_2+3.1402H_2O+29.8325N_2+0.0144SO_2+0.0117FeO$ 8% Excess Air Combustion and Resulting Fe Required for $NO_x$ Reduction:

$6.325CO_2+2.7H_2O+30.2467N_2+0.0144SO_2+0.0026NO_2+0.008NO+0.5927O_2+0.0132Fe+0.05C_{12}H_{22}O_{11} \rightarrow 6.9173CO_2+3.2429H_2O+30.2520N_2 0.0144SO_2+0.0132FeO$ The following table demonstrates the quantities of sugar and elemental iron, in pounds, required to be added to the vicinity of the combustion zone of such a boiler in order to eliminate all the excess air oxygen and the $NO_2$ and NO.

TABLE E

Excess $O_2$ and $NO_x$ Elimination Matrix
22,500 lbs of Coal/Hr (264,375,000 BTU/Hr)

| Excess Air | lbs of Sugar/Hr | lbs of Fe/Hr |
|---|---|---|
| 4% = | 1894 | 116 |
| 6.5% = | 3078 | 148 |
| 8% = | 3797 | 166 |

$SO_2$ Emissions Reduction

The reduction of $SO_2$ is accomplished in the flue gas train just outside the boiler by forming iron sulfide (FeS) from a curtain of ground elemental iron shavings (Fe) sprayed across the path of the flue gas train; $SO_2$ reacts with Fe at a rate of 3 moles of Fe to one mole of $SO_2$ ($3Fe+SO_2 \rightarrow 2FeO+FeS$). If $SO_2$ content of a flue gas train is particularly high, this same process may be performed a second time, just below the particulate reduction water spray in the stack.

The quantity of 0.0144 moles of $SO_2$ is constant in each case set forth below wherein 4%, 6.5% and 8% excess air combustion is respectively used. The calculations show that 0.0132 mole of additional elemental iron is required to reduce $SO_2$ to 0.01 # mole for each 100 lbs of coal. This is equal to 166 pounds of iron each hour for the combustion of 22,500 pounds of coal with 4% excess air. It can be seen that there are greater reductions of $SO_2$ which occur when operating at 6.5% and 8% which will require proportionately greater amounts of Fe.

$CO_2$ Emissions Reduction

The FeO that is created either by reduction of NOx or combination with excess $O_2$ has an extra benefit because one mole of FeO will remove one mole of $CO_2$ (FeO+$CO_2 \rightarrow FeCO_3$). Thus, 72 pounds of iron oxide (FeO) will eliminate about 44 pounds of $CO_2$ from the flue gas stream. Representative calculations follow and illustrate the optimum effect that would be had for both $CO_2$ and $SO_2$ reduction employing a minimum amount of Fe.

4% Excess Air Combustion—$CO_2$ and $SO_2$ Reduction:
$6.6205CO_2+2.9709H_2O+29.1334N_2+0.0144SO_2+0.0092FeO+0.0132Fe \rightarrow 6.6025CO_2+2.9709H_2O+29.1334N_2+0.01SO_2+0.0044FeS+0.018FeCO_3$ 6.5% Excess Air Combustion—$CO_2$ and $SO_2$ Reduction:
$6.8052CO_2+3.1402H_2O+29.8325N_2+0.0144SO_2+0.0117FeO+0.0132Fe \rightarrow 6.7792CO_2+3.1402H_2O+29.8325N_2+0.00725SO_2+0.00715FeS+0.026FeCO_3$ 8% Excess Air Combustion—$CO_2$ and $SO_2$, Reduction:
$6.9173CO_2+3.2429H_2O+30.2520N_2+0.0144SO_2+0.0132FeO+0.0132Fe \rightarrow 6.8865CO_2+3.2429H_2O+30.2520N_2+0.0056SO_2+0.0088FeS+0.0308FeCO_3$ Mercury and Other Heavy Metals Emissions Reduction The injection of magnetite atop the coal bed causes the destructive distillation products of coal to interact with such a magnetite layer at a location below the combustion zone. As a result, mercury will amalgamate into a compound structure of spongy iron-mercury oxide $(FeO)_3HgO$ upon the surface of the particles of magnetite and other heavy metals will be likewise sequestered.

Based on an average quantity of about 2.5 lbs/hr of heavy metals (those listed in Table F below were found in Utah Scoffield dry coal with a BTU rating of 11,800 per pound of coal), the injection of about two moles of magnetite for each mole of heavy metals are recommended, which would be equal to about 5 pounds of magnetite per hour for this purpose. This amount should assure fairly even distribution across the coal bed. Such will effectively amalgamate the mercury and sequester the other heavy metals, which will then fall out the fly-ash chute as "red iron". Generally, magnetite will capture mercury and other heavy metals in a ratio of one mole of magnetite to one mole of mercury ($Fe_3O_4+Hg \rightarrow (FeO)_3HgO$) or as a spongy iron-mercury-sulfide oxide ($Fe_3O_4+HgS \rightarrow (FeO)_3HgSO$). Generally, $Fe_3O_4$ also reacts mole for mole with lead ($Fe_3O_4+Pb \rightarrow (FeO)_3PbO$) and with the other listed heavy metals, or it may form a spongy iron-lead-sulfide oxide complex ($Fe_3O_4+PbS \rightarrow (FeO)_3PbSO$).

TABLE F

| Heavy Metals | Symbol | ppm Dry Basis |
|---|---|---|
| Mercury | Hg | 0.03 |
| Lead | Pb | 2.00 |
| Barium | Ba | 52.00 |
| Strontium | Sr | 57.00 |
| Arsenic | As | 0.80 |
| Total | | 111.83 |

EXAMPLE 4A

As an alternative to the utilization of a carbohydrate, such as sugar, in order to minimize the quantity of elemental iron required to reduce $NO_x$, an arrangement may be used when a substoichiometric amount of air is supplied to achieve initial primary combustion of fuel, such as coal, with $O_2$ being injected at a later stage.

Such an operation of the boiler combustion zone using a substoichiometric amount of air results in initial incomplete combustion but an overall increase in BTU output (due to not needing to supply heat to raise the temperature of additional outside air), while at the same time resulting in a reduction in the normal amounts of $NO_2$, CO and $CO_2$ while leaving some minimal unoxidized carbon.

A lesser amount of elemental iron then needs to be injected into the boiler near the bottom of the "rag" layer (see FIG. 7, port 73) to react with the oxygen of $NO_2$. Pure oxygen is then injected near the top of the "rag" layer (see FIG. 7, port 75), to mix with the unoxidized carbon, burning it to create super-high boiler temperatures in the region of the top of the "rag" layer and in the region of the soot blowers. This effectively converts the carbon to $CO_2$, well before it reaches the region of the heat exchanger tubes.

Generally when a stoichiometric or greater than stoichiometric amount of air is employed in the combustion zone, the assumption is that, at such high boiler temperatures, combustion to $CO_2$, $H_2O$, $NO_2$ and $SO_2$ will be generally complete. Accordingly, the equations mentioned hereinbefore would apply. On the other hand, when combustion is purposely carried out under substoichiometric conditions in the initial combustion zone, the effect will be one of some initial destructive distillation, as a result of which it may be reasonably assumed that about three times as much hydrogen cyanide will be released from the coal than was previously assumed in Example 4. Moreover, it also appears that the hydrogen cyanide may react variously in accordance with the following three equations; it is arbitrarily assumed that about one-third of the HCN (or about 0.0026 mole HCN) will react in accordance with each equation.

1. $2HCN+5O_2 \rightarrow_{H2} O_2+2CO_2+2NO_2$  HCN+$2.5O_2 \rightarrow 0.5H_2O_2+CO_2+NO_2$ $0.0026HCN+0.0065O_2 \rightarrow 0.0013H_2O_2+0.0026CO_2+0.0026NO_2$ 2. $2HCN+2O_2 \rightarrow H_2O_2+C+CO_2+N_2$  HCN+$O_2 \rightarrow 0.5H_2O_2+0.5C+0.5CO_2+0.5N_2$ $0.0026HCN+0.0026O_2 \rightarrow 0.0013H_2O_2+0.0013CO_2+0.0013N_2$ 3. $2HCN+2.5O_2 \rightarrow H_2O_2+CO+CO_2+N_2$  HCN+$1.25O_2 \rightarrow 0.5H_2O_2+0.5CO+0.5CO_2+0.5N_2$ $0.0026HCN+0.00325O_2 \rightarrow 0.0013H_2O+0.0013CO_2+0.0013N_2$.

Assuming that 100 lbs. of coal are burned as in Example 1, and 7.437 mole of $O_2$ is supplied from air, the following calculation would be appropriate:
$(6.325-0.0026-0.0026-0.0026)$ C+$(2.7-0.0013-0.0013-0.0013)$ $H_2+0.255O_2(i)+7.437O_2(th)+(7.437)(3.76)N_2(th)+(0.518-0.0013-0.0013-0.0013)N_2(i)+0.0144S+0.0026HCN+0.0026HCN+0.0026HCN \rightarrow$
$6.3172CO_2+2.6961H_2O+27.9631N_2(th)+0.5141N_2(i)+0.0144SO_2+0.0026NO_2+0.0026CO_2+0.0013H_2O_2+0.0013CO_2+0.0013N_2+0.0013C+0.0013H_2O_2+0.0013CO+0.0013CO_2+0.0013H_2O_2+0.0013N_2 \rightarrow$
$(6.3172+0.0026+0.0013+0.0013)CO_2+2.6961H_2O+(27.9631+0.5141+0.0013+0.0013)$ $N_2+0.0144SO_2+(0.0013+0.0013+0.0013)H_2O_2+0.0013C+0.0013CO+0.0026NO_2$ The results set forth just above can then be altered by the injection of elemental iron at the bottom of the rag layer, e.g. through port 73 of FIG. 7, so as to have the following effect:
$6.3224CO_2+2.6961H_2O+28.4798N_2+0.0144SO_2+0.0039H_2O_2 0.0013C+0.0013CO+0.0026NO_2+0.0091Fe \rightarrow 6.3224CO_2+2.6961H_2O+28.4811N_2+0.0144SO_2+0.0039H_2O_2+0.0013C+0.0013CO+0.0091FeO$ The following equation shows the subsequent effect of the injection of $O_2$ gas into the boiler near the top of the rag layer, e.g. through port 75 of FIG. 7:

$6.3224CO_2+2.6961H_2O+28.4811N_2+0.0144SO_2+0.0039H_2O_2+0.0013C+0.0013CO+0.0091FeO+0.0013O_2 \rightarrow 6.325CO_2+2.7H_2O+28.4811N_2+0.0144SO_2+0.0091FeO$ The result of the combustion of 22,500 lbs of coal per hour in this manner with the injection of 115 lbs of elemental iron per hour and 15 lbs of $O_2$ gas per hour produces a reduced quantity of $NO_x$, and $SO_x$, and by using substantially less air than combustion with 6.5% excess air, it conserves about 1.1% of the total of BTU capacity of coal which is not "wasted" in raising the temperature of the nitrogen component of the air in the combustion zone. This calculates to over 3,000,000 BTUs per hour of savings and thus would result in a substantial reduction in the quantity of coal or other fuel needed to meet the same operational BTU requirement. Moreover, it is expected that further savings will also be obtained from the reduction in the amount of gradual soot buildup on the heat exchanger tubes which will also result.

Although the invention has been described with regard to certain preferred embodiments, it should be understood that various changes and modifications as would be obvious to one having ordinary skill in this art may be made without departing from the scope of the invention which is defined by the claims appended hereto. For example, although the invention expediently generates and supplies particulate elemental iron in situ to the described grinding/flaking process, it should be understood that iron flakes or iron powder could be manufactured elsewhere and then transported and injected in such form into the combustion chamber using an appropriate carrier gas, such as nitrogen.

Particular features of the invention are set forth in the claims which follow.

What is claimed is:

1. A method of reducing $NO_x$ and/or $CO/CO_2$ emissions from the combustion of a coal product or a hydrocarbon, which method comprises:
   burning a hydrocarbon in a combustor in association with a gas turbine to create hot gaseous combustion products;
   contacting said gaseous combustion products in the exhaust stream exiting said combustor while said stream is at a temperature of at least about 700° F. with particulate elemental iron to cause chemical and/or physical reactions to occur,
   whereby such reactions result in the production of solid iron oxide and/or iron carbide reaction products that are removed from an emission stream including the products of said combustion, and
   thereafter discharging said emission stream to the atmosphere downstream of said gas turbine.

2. The method of claim 1 wherein the gas turbine is a combined-cycle combustion turbine and wherein said exhaust stream from the combustor is contacted with a curtain of particulate elemental iron prior to passage through said turbine and reduces the quantity of $NO_x$ and reduces potential hydrogen embrittlement of turbine blades.

3. The method of claim 1 wherein said particulate elemental iron is iron powder.

4. A method of reducing $NO_x$ and/or $CO/CO_2$ emissions from the flue gas stream exiting from a coal-fired boiler, which method comprises:
   burning a coal product to create hot gaseous combustion products, and
   exposing said gaseous combustion products to contact with particulate elemental iron at a temperature of at least about 700° F. to cause said elemental iron to chemically react therewith, and
   injecting a curtain of particulate elemental iron into the flue gas stream at a location downstream of the boiler where it reacts with $SO_2$,
   whereby such chemical reactions produce solid iron oxide and/or iron carbides and/or iron sulfide that are removed from the flue gas which is of reduced $NO_x$, $SO_2$ and/or $CO/CO_2$ content as a result of such chemical reactions.

5. The method according to claim 4 wherein said particulate iron is injected generally radially into the boiler at locations generally above and aligned with streams of particulate coal which are also being injected generally radially into the boiler.

6. The method according to claim 5 wherein such injection of particulate elemental iron radially into said boiler occurs at a plurality of locations spaced generally uniformly about the circumference of said boiler.

7. The method of claim 4 wherein said particulate elemental iron is iron powder.

8. The method according to claim 4 wherein a recycle stream of gas is taken from a main gas stream exiting from said tube bundle and is returned to a location below said tube bundle and wherein said particulate elemental iron is injected into said recycle gas stream and carried therewith into the boiler.

9. A method of reducing $NO_x$ and/or $CO/CO_2$ emissions from the flue gas stream exiting from a coal-fired boiler, which method comprises:
   burning a coal product to create hot gaseous combustion products, and
   exposing said gaseous combustion products at a temperature of at least about 700° F. to contact with particulate elemental iron by comminuting a solid length of elemental iron to produce particulate elemental iron which is injected into said boiler to cause said elemental iron to chemically react with said combustion products,
   whereby such chemical reactions produce solid iron oxide and/or iron carbides that are removed from the flue gas which is of reduced $NO_x$ and/or $CO/CO_2$ content as a result of such chemical reactions.

10. The method according to claim 9 wherein said comminuting comprises grinding a malleable rod of elemental iron having a diameter between about 3/16 inch and about 1/2 inch.

11. The method according to claim 10 wherein said comminuting of said length of solid iron takes place under an inert or nitrogen atmosphere.

12. A method of reducing $NO_x$ and/or $CO/CO_2$ emissions from the flue gas stream exiting from a coal-fired boiler, which method comprises:
   burning a coal product containing sulfur to create hot gaseous combustion products, and
   exposing said gaseous combustion products at a temperature of at least about 700° F. to contact with particulate elemental iron to cause said elemental iron to chemically react therewith to produce iron sulfide,
   whereby such chemical reactions produce solid iron sulfide, iron oxide and/or iron carbides that are removed from the flue gas which is of reduced $SO_x$ $NO_x$ and/or $CO/CO_2$ content as a result of such chemical reactions.

13. A method of reducing $NO_x$ and/or $CO/CO_2$ emissions from the flue gas stream exiting from a coal-fired boiler, which method comprises:
   burning a coal product to create hot gaseous combustion products, and
   exposing said gaseous combustion products at a temperature of at a temperature of at least about 700° F. to contact with particulate elemental iron injected into said boiler in sufficient quantity to cause said elemental iron to chemically react with said gaseous combustion products and produce solid iron oxide and iron carbides that are removed from the flue gas which, as a result of such chemical reaction, is of significantly reduced $NO_x$ and $CO_2$ content compared to that which would otherwise be present in said flue gas stream exiting said boiler.

14. A method of reducing $NO_x$ and/or $CO/CO_2$ emissions from the flue gas stream exiting from a coal-fired boiler, which method comprises:

burning a coal product to create hot gaseous combustion products, exposing said gaseous combustion products to contact with particulate elemental iron to cause said elemental iron to chemically react therewith by injecting said particulate elemental iron into an adjustable "rag" layer within the boiler at a horizontal location between a zone where the oxidation of said coal product begins and below a region of generally horizontal boiler tubes, the temperature of said "rag" layer being at least about 1000° F., and feeding magnetite ($Fe_3O_4$) into the boiler at a location vertically above the region where coal is entering and below said boiler tubes, whereby such chemical reactions produce solid iron oxide and/or iron carbides that are removed from the flue gas which is of reduced $NO_x$ and/or $CO/CO_2$ content as a result of such chemical reactions.

15. The method according to claim 14 wherein said coal product contains measurable quantities of mercury and wherein sufficient particulate elemental iron and magnetite are injected into said boiler to adsorb mercury in a manner that said adsorbed mercury is removed from the exhaust being discharged to the atmosphere.

16. A method of reducing undesirable emissions from the flue gas stream exiting from a combustor burning a coal product or a hydrocarbon, which method comprises:

generally completely burning a coal product or hydrocarbon using a substoichiometric amount of air to initially supply oxygen for combustion to create hot gaseous combustion products, exposing said gaseous combustion products to contact with particulate elemental iron at a temperature of at least about 700° F. to cause said elemental iron to chemically react therewith, injecting gaseous $O_2$ into said gaseous combustion products at a location following said contact with said elemental iron to complete said burning and while said elemental iron's exerting a stronger attraction for oxygen than does nitrogen from the initial air, whereby such chemical reactions produce solid iron oxides, iron carbonates and/or iron carbides that are removed from the flue gas which has reduced $NO_x$ content as a result of such chemical reactions of these undesirable emissions.

17. The method of claim 16, wherein the combustor is a boiler having a plurality of heat exchanger tubes and wherein gaseous oxygen is injected at a location between the location where contact with particulate elemental iron takes place and the location of the boiler heat exchanger tubes.

18. The method of claim 16 wherein said particulate elemental iron is iron powder.

* * * * *